US011476477B2

(12) United States Patent
Namba et al.

(10) Patent No.: US 11,476,477 B2
(45) Date of Patent: Oct. 18, 2022

(54) FUEL CELL SYSTEM, CONTROL METHOD OF FUEL CELL SYSTEM, AND STORAGE MEDIUM

(71) Applicant: TOYOTA JIDOSHA KABUSHIKI KAISHA, Toyota (JP)

(72) Inventors: Ryouichi Namba, Okazaki (JP); Hiroyuki Tsunekawa, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 17/212,483

(22) Filed: Mar. 25, 2021

(65) Prior Publication Data

US 2021/0376345 A1 Dec. 2, 2021

(30) Foreign Application Priority Data

May 29, 2020 (JP) .............................. JP2020-094136

(51) Int. Cl.
*H01M 8/04* (2016.01)
*H01M 8/04223* (2016.01)
(Continued)

(52) U.S. Cl.
CPC ... *H01M 8/04268* (2013.01); *H01M 8/04037* (2013.01); *H01M 8/0488* (2013.01);
(Continued)

(58) Field of Classification Search
CPC ......... H01M 8/04268; H01M 8/04225; H01M 8/04302; H01M 8/04037; H01M 8/04679; H01M 8/04701; H01M 8/0488
(Continued)

(56) References Cited

U.S. PATENT DOCUMENTS

2007/0202367 A1* 8/2007 Yoshida ............ H01M 8/04679
429/444
2010/0291447 A1* 11/2010 Imanishi ........... H01M 8/04559
429/429
(Continued)

FOREIGN PATENT DOCUMENTS

JP 2007-188827 A 7/2007
WO WO 2010/150337 A1 12/2010

*Primary Examiner* — James M Erwin
(74) *Attorney, Agent, or Firm* — Finnegan, Henderson, Farabow, Garrett & Dunner, LLP

(57) ABSTRACT

A fuel cell system includes: a fuel cell; a target operating point determination unit that determines a warm-up target operating point based on a required electric power amount during warm-up and a required heat generation amount during warm-up; an operation control unit; and a failure state identification unit that identifies whether an electric power consumption device that operates by consuming generated electric power generated by the fuel cell has failed. When a failure of the electric power consumption device is identified, the target operating point determination unit determines an operating point that satisfies a required electric power amount during a failure that is set to be smaller than the required electric power amount during the warm-up and a required heat generation amount during the failure that is set to be smaller than the required heat generation amount during the warm-up as a target operating point during the failure.

11 Claims, 9 Drawing Sheets

(51) Int. Cl.
　　　*H01M 16/00*　　　(2006.01)
　　　*H01M 8/04007*　　(2016.01)
　　　*H01M 8/04701*　　(2016.01)
　　　*H01M 8/04858*　　(2016.01)
　　　*H01M 10/0525*　　(2010.01)
　　　*H01M 8/04302*　　(2016.01)
　　　*H01M 8/04225*　　(2016.01)
　　　*H01M 8/04664*　　(2016.01)

(52) U.S. Cl.
　　　CPC ... *H01M 8/04225* (2016.02); *H01M 8/04302* (2016.02); *H01M 8/04679* (2013.01); *H01M 8/04701* (2013.01); *H01M 10/0525* (2013.01); *H01M 16/006* (2013.01); *H01M 2220/20* (2013.01); *H01M 2250/20* (2013.01)

(58) Field of Classification Search
　　　USPC .............................................................. 429/9
　　　See application file for complete search history.

(56) References Cited

U.S. PATENT DOCUMENTS

| | | | |
|---|---|---|---|
| 2012/0107706 A1 | 5/2012 | Tanaka et al. | |
| 2014/0120382 A1* | 5/2014 | Taniguchi | H01M 8/04731 |
| | | | 429/9 |
| 2016/0351928 A1* | 12/2016 | Hoshi | H01M 8/04582 |
| 2019/0270392 A1* | 9/2019 | Sakai | H01M 8/04089 |

* cited by examiner

[COMPARATIVE EXAMPLE]

FUEL CELL SYSTEM, CONTROL METHOD OF FUEL CELL SYSTEM, AND STORAGE MEDIUM

CROSS-REFERENCE TO RELATED APPLICATION

This application claims priority to Japanese Patent Application No. 2020-094136 filed on May 29, 2020, incorporated herein by reference in its entirety.

BACKGROUND

1. Technical Field

The present disclosure relates to a fuel cell system, a control method of the fuel cell system, and a storage medium.

2. Description of Related Art

It has been proposed in a fuel cell system that, when the temperature of the fuel cell is detected to be low, a warm-up operation is executed to rapidly raise the temperature of a power generation portion. For example, WO 2010/150337 discloses a technique where, when starting the fuel cell system at a temperature below the freezing point, a warm-up operation is executed in which electric power is generated at a lower air stoichiometric ratio than when starting at room temperature while rotating a circulation pump to operate the fuel cell stack at a low efficiency and increase the amount of discharged heat. The electric power generated by such a warm-up operation is consumed by auxiliary machines or stored in a secondary battery. Assumed auxiliary machines are, for example, a pump for supplying a reaction gas used in the fuel cell system, a heater for air conditioning of a vehicle in a configuration in which the fuel cell system is mounted on a vehicle, etc.

SUMMARY

However, if the auxiliary machines are in a failed state when the warm-up operation described above is executed, the secondary battery may be overcharged. Further, if the amount of the electric power required for the fuel cell stack is reduced in order to avoid such overcharging, the air stoichiometric ratio is excessively lowered. When the air stoichiometric ratio is excessively lowered in this way, the fuel cell operates in an operating region where the change in the output voltage with respect to the change in the air stoichiometric ratio is large. This causes an issue that the output voltage and the output current of the fuel cell become unstable. Therefore, a technique is desired that is capable of suppressing the output voltage and the output current of the fuel cell from becoming unstable in a situation where a device capable of consuming electric power generated by the warm-up operation has failed.

The present disclosure can be implemented in the following aspects.

(1) An aspect of the present disclosure provides a fuel cell system. The fuel cell system includes: a fuel cell that receives supply of air and fuel gas to generate electric power, a target operating point determination unit that determines a warm-up target operating point based on a required electric power amount during warm-up and a required heat generation amount during warm-up when a predetermined condition for starting warm-up operation is satisfied, the warm-up target operating point being a target of an operating point during the warm-up operation of the fuel cell that is defined by an output voltage and an output current; an operation control unit that controls at least one of the output voltage and the output current to operate the fuel cell at the warm-up target operating point; and a failure state identification unit that identifies whether an electric power consumption device that operates by consuming generated electric power generated by the fuel cell has failed. When a failure of the electric power consumption device is identified, the target operating point determination unit determines an operating point that satisfies a required electric power amount during a failure that is set to be smaller than the required electric power amount during the warm-up and a required heat generation amount during the failure that is set to be smaller than the required heat generation amount during the warm-up as a target operating point during the failure. According to the fuel cell system of the above aspect, when a failure of the electric power consumption device is identified, an operating point that satisfies a required electric power amount during a failure that is set to be smaller than the required electric power amount during the warm-up and a required heat generation amount during the failure that is set to be smaller than the required heat generation amount during the warm-up is determined as a target operating point during the failure. Thus, it is possible to suppress the air stoichiometric ratio from being excessively reduced as compared with the configuration in which the operating point with a reduced required electric power amount during the warm-up is determined as a new warm-up target operating point while maintaining the required heat generation amount during the warm-up, and the fuel cell is operated so as to match such a warm-up target operating point. Therefore, it is not necessary to operate the fuel cell at the operating point where the air stoichiometric ratio sensitivity with respect to the output voltage is larger, and the stability at the target operating point during the failure, that is, the ease of maintaining the output voltage and the output current to the value of the warm-up target operating point, can be improved. This can suppress the output voltage and the output current of the fuel cell from becoming unstable in a situation where an electric power consumption device capable of consuming electric power generated by the warm-up operation has failed.

(2) In the fuel cell system according to the above aspect, a voltage value of the target operating point during the failure may be a voltage value that falls within a predetermined voltage range including a voltage value of the warm-up target operating point that is determined when the condition is satisfied in a situation where the failure of the electric power consumption device is not identified. The voltage range may be a range of a voltage value in which a rate of a change in the output voltage with respect to a change in an air stoichiometric ratio by unit amount when the air stoichiometric ratio is changed in a state where the fuel cell is operated at the target operating point during the failure is equal to or less than a predetermined threshold rate. According to the fuel cell system of the above aspect, a voltage value of the target operating point during the failure is a voltage value that falls within a predetermined voltage range including a voltage value of the warm-up target operating point that is determined when the predetermined condition for starting the warm-up operation is satisfied in a situation where the failure of the electric power consumption device is not identified. The predetermined voltage range described above is a range of a voltage value in which a rate of a change in the output voltage with respect to a change in an air stoichiometric ratio by unit amount when the air stoichiometric ratio is changed in a state where the fuel cell is operated at the target operating point during the failure is equal to or less than a predetermined threshold rate. Compared to a configuration in which an operating point having a voltage value lower than the predetermined voltage range is determined as the target operating point, the stability at the target operating point during the failure, that is, the ease of maintaining the voltage and the current to the value of the target operating point, can be improved. This can suppress the voltage and the current of the fuel cell from becoming unstable in a situation where an electric power consumption device capable of consuming electric power generated by the warm-up operation has failed.

(3) in the fuel cell system according to the above aspect, the fuel gas may be hydrogen gas. A lower limit voltage value of the voltage range may be a voltage value in which an amount of the hydrogen gas generated at a cathode of the fuel cell is equal to or less than a predetermined threshold amount when the fuel cell is operated at the target operating point during the failure. According to the fuel cell system of the above aspect, a lower limit voltage value of the predetermined voltage range is a voltage value in which an amount of the hydrogen gas generated at a cathode of the fuel cell is equal to or less than a predetermined threshold amount when the fuel cell is operated at the target operating point during the failure. Thus, when the warm-up operation is executed in the situation where the electric power consumption device has failed, the concentration of hydrogen gas discharged from the fuel cell can be kept low.

(4) The fuel cell system according to the above aspect may include a lithium ion secondary battery configured to store the generated electric power. The lower limit voltage value of the voltage range may be a voltage value in which an amount of lithium metal deposited at a cathode of the lithium ion secondary battery is equal to or less than a predetermined amount when the fuel cell is operated at the target operating point during the failure and the generated electric power is supplied to the lithium ion secondary battery. According to the fuel cell system of the above aspect, the lower limit voltage value of the predetermined voltage range is a voltage value in which an amount of lithium metal deposited at a cathode of the lithium ion secondary battery is equal to or less than a predetermined amount when the fuel cell is operated at the target operating point during the failure and the generated electric power is supplied to the lithium ion secondary battery. Thus, when the warm-up operation is executed in the situation where the electric power consumption device has failed, the amount of lithium metal deposited at the cathode of the lithium ion secondary battery can be suppressed to a low level, and the deterioration of the secondary battery can be suppressed.

(5) in the fuel cell system according to the above aspect, a predetermined allowable deviation range may be predetermined for the required heat generation amount during the warm-up. An upper limit voltage value of the voltage range may be a voltage value in which a heat generation amount of the fuel cell achieves a lower limit value of the allowable deviation range. According to the fuel cell system of the above aspect, an upper limit voltage value of the predetermined voltage range is a voltage value in which a heat generation amount of the fuel cell achieves a lower limit value of the predetermined allowable deviation range. Thus, it is possible to suppress the heat generation amount of the fuel cell from falling below the lower limit value of the predetermined allowable deviation range, and it is possible to suppress the time required for the warm-up to be completed from becoming equal to or longer than a predetermined time. Therefore, it is possible to improve the convenience of the user and suppress the air flow path in the fuel cell from being filled with the generated water generated by the warm-up operation.

(6) In the fuel cell system according to the above aspect, after starting the warm-up operation, the operation control unit may end the warm-up operation when a temperature of the fuel cell reaches a predetermined warm-up completion temperature. The fuel cell system may further include an increase and decrease restriction unit that increases or decreases the required electric power amount during the warm-up until the warm-up operation ends when the failure state identification unit identifies that the electric power consumption device has failed. According to the fuel cell system of the above aspect, an increase and a decrease in the required electric power amount during the warm-up are restricted until the warm-up operation ends when the failure state identification unit identifies that the electric power consumption device has failed. Thus, it is possible to restrict a change in the operating point due to an increase or a decrease in the required electric power amount during the warm-up during the warm-up operation. Thus, the voltage and the current when starting the fuel cell can be suppressed from becoming unstable.

(7) In the fuel cell system according to the above aspect, the fuel cell system may be mounted on a moving body to supply electric power to a drive device of the moving body. When the failure state identification unit identifies that the electric power consumption device has failed, the increase and decrease restriction unit may restrict electric power supplied to the drive device to restrict an increase and a decrease in the required electric power amount during the warm-up until the warm-up operation ends. According to the fuel cell system of the above aspect, when the failure state identification unit identifies that the electric power consumption device has failed, the increase and decrease restriction unit restricts electric power supplied to the drive device to restrict an increase and a decrease in the required electric power amount during the warm-up until the warm-up operation ends. Thus, the increase and the decrease in the required electric power amount during the warm-up can be restricted more reliably. This is because when electric power supplied to the drive device is restricted, the drive of the moving body is restricted, which enables restriction of the increase and the decrease in the required electric power amount during the warm-up according to the drive condition.

(8) In the fuel cell system according to the above aspect, the fuel cell system may be mounted on a vehicle having a plurality of gear ranges including at least a parking range and a driving range, and may supply electric power to a traction motor of the vehicle. The fuel cell system may further include a voltage sensor for measuring the output voltage. When the gear range that is selected is the parking range and a measured voltage measured by the voltage sensor is larger than a predetermined threshold voltage, the operation control unit may execute an actual voltage control process to adjust at least the air stoichiometric ratio such that the measured voltage measured by the voltage sensor approaches the voltage value of the target operating point during the failure. According to the fuel cell system of the above aspect, when the gear range that is selected is the parking range and a measured voltage measured by the voltage sensor is larger than a predetermined threshold voltage, an actual voltage control process is executed to adjust at least the air stoichiometric ratio such that the measured voltage measured by the voltage sensor approaches the voltage value of the target operating point during the failure. Thus, it is possible to suppress the deviation between the voltage of the fuel cell and the voltage value of the target operating point during the failure from becoming excessively large. When the voltage measured by the voltage sensor is larger than the predetermined threshold voltage, there is a high possibility that air remains in the fuel cell or the air supply path to the fuel cell. In such a case, if the operating point is controlled based on the flow rate of air, the actual voltage value may deviate from the planned voltage value due to power generation using the remaining air, and the deviation between the voltage of the fuel cell and the voltage value of the target operating point during the failure can become excessively large. However, according to the fuel cell system of the above aspect, the operating point is controlled based on the measured voltage, so that the above-mentioned effect can be obtained.

(9) In the fuel cell system according to the above aspect, when the gear range that is selected is not the parking range and a voltage difference between the voltage value of the target operating point during the failure and the measured voltage is larger than a predetermined threshold voltage difference, the operation control unit may execute the actual voltage control process. According to the fuel cell system of the above aspect, when the gear range that is selected is not the parking range and a voltage difference between the voltage value of the target operating point during the failure and the measured voltage is larger than a predetermined threshold voltage difference, the actual voltage control process is executed. Thus, it is possible to suppress the deviation between the voltage of the fuel cell and the voltage value of the target operating point during the failure from becoming excessively large. When the selected gear range is not the parking range, the vehicle can be moved (driven), and the required electric power amount during the warm-up may increase or decrease significantly, which may cause the actual voltage value to deviate significantly from the planned voltage value. However, according to the fuel cell system of the above aspect, in such a case, the actual voltage control process is executed to control the operating point based on the measured voltage. Thus, it is possible to suppress the deviation between the voltage of the fuel cell and the voltage value of the target operating point during the failure from becoming excessively large.

The present disclosure can also be implemented in various forms other than the fuel cell system. For example, the present disclosure can be implemented in forms such as a control device of a fuel cell system, a vehicle equipped with a fuel cell system, a method for determining a target operating point, a method for controlling a fuel cell system, a computer program for realizing these devices and methods, and a storage medium that stores such a computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A1. System Configuration

Figure 1:
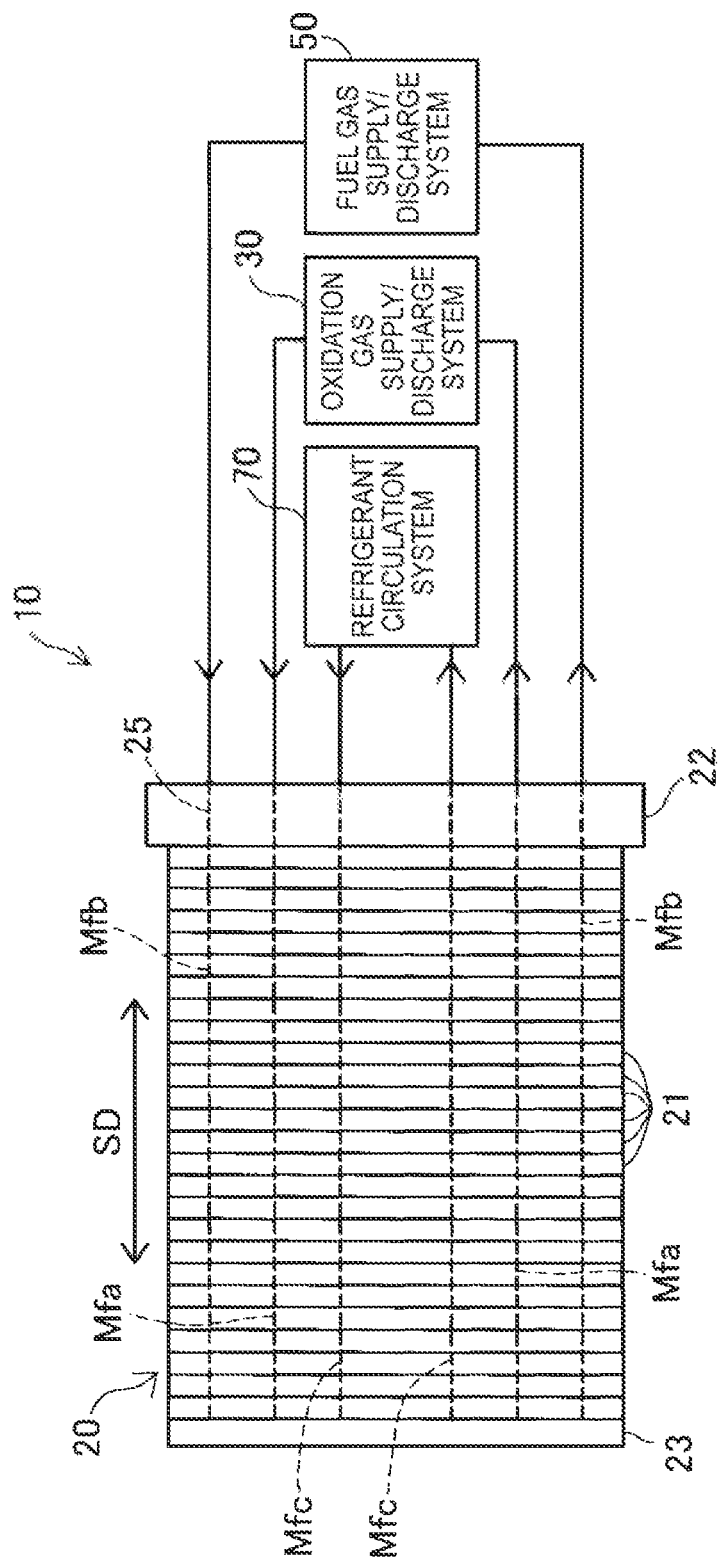
FIG. 1 is a schematic view showing a configuration of a fuel cell system according to a first embodiment.

FIG. 1 is a schematic view showing a configuration of a fuel cell system 10 according to a present embodiment. The fuel cell system 10 according to the present embodiment is mounted and used in a vehicle having a plurality of gear ranges including a parking range and a driving range. The fuel cell system 10 generates electric power in response to a request from a load (load 200 described later) including a traction motor (not shown) included in the vehicle, and also generates electric power and supplies electric power for external power supply. The fuel cell system 10 includes a fuel cell stack 20, an oxidation gas supply/discharge system 30, a fuel gas supply/discharge system 50, and a refrigerant circulation system 70.

The fuel cell stack 20 includes a plurality of unit cells 21 and a pair of end terminals 22 and 23. Each of the unit cells 21 has a plate-like appearance shape, and is stacked in the stacking direction SD, which is the thickness direction. The unit cell 21 is a power generation element capable of generating electric power by itself. The unit cell 21 receives an oxidation gas and a fuel gas as reaction gases, and generates electric power through electrochemical reactions thereof. In the present embodiment, the unit cell 21 is configured as a polymer electrolyte fuel cell. In the present embodiment, air is used as the oxidation gas, and hydrogen gas is used as the fuel gas. The fuel cell stack 20 is also simply referred to as a "fuel cell".

The unit cell 21 includes a membrane electrode assembly in which an anode and a cathode, which are electrodes carrying a catalyst, are arranged on both sides of an electrolyte membrane composed of a polymer resin film having ionic conductivity. The unit cell 21 further includes two separators that interpose the membrane electrode assembly therebetween. The illustration of the membrane electrode assembly and the separators is omitted. At outer peripheral end portions of each unit cell 21, openings (not shown) are provided that constitute manifolds Mfa and Mfb for flowing reaction gas and reaction off gas that has passed through the power generation portion of the membrane electrode assembly. The manifolds Mfa and Mfb are branched and connected to the power generation portion of the membrane electrode assembly. The manifold Mfa is connected to the cathode and the manifold Mfb is connected to the anode. Further, at the outer peripheral end portion of each unit cell 21, an opening (not shown) is provided that constitutes a manifold Mfc for circulating a refrigerant. The manifold Mfc is connected to a refrigerant flow path provided between adjacent separators.

One of the end terminals 22 and 23 is arranged at one end of the unit cells 21 in the stacking direction SD, and the other is arranged at the other end of the unit cells 21 in the stacking direction SD. The first end terminal 22 has openings 25 that are through holes for providing the manifolds Mfa, Mfb, and Mfc. On the other hand, such openings 25 are not provided in the second end terminal 23. In the fuel cell stack 20, the fuel gas, the oxidation gas, and the refrigerant are supplied to and discharged from the fuel cell stuck 20 through the first end terminal 22 side.

The oxidation gas supply/discharge system 30 has an oxidation gas supply function, an oxidation gas discharge function, and an oxidation gas bypass function. The oxidation gas supply function is a function of supplying air, which is an oxidation gas, to the cathodes of the unit cells 21. The oxidation gas discharge function is a function of discharging the oxidation gas, the inert gas, and the exhaust gas including waste water (also referred to as "cathode off gas") discharged from the cathodes of the unit cells 21 to the outside. The cathode off gas may further include a fuel gas (hydrogen gas) generated at the cathodes, which will be described later. The oxidation gas bypass function is a function of discharging a part of the air containing the supplied oxidation gas to the outside without passing through the unit cells 21.

The fuel gas supply/discharge system 50 has a fuel gas supply function, a fuel gas discharge function, and a fuel gas circulation function. The fuel gas supply function is a function of supplying fuel gas to the anodes of the unit cells 21. The fuel gas discharge function is a function of discharging the fuel gas, the inert gas, and the exhaust gas including waste water (also referred to as "anode off gas") discharged from the anodes of the unit cells 21 to the outside. The fuel gas circulation function is a function of circulating the anode off gas in the fuel cell system 10.

The refrigerant circulation system 70 has a function of circulating the refrigerant in the fuel cell stack 20 to adjust the temperature of the fuel cell stack 20. As the refrigerant, for example, an antifreeze liquid such as ethylene glycol or a liquid such as water is used.

Figure 2:
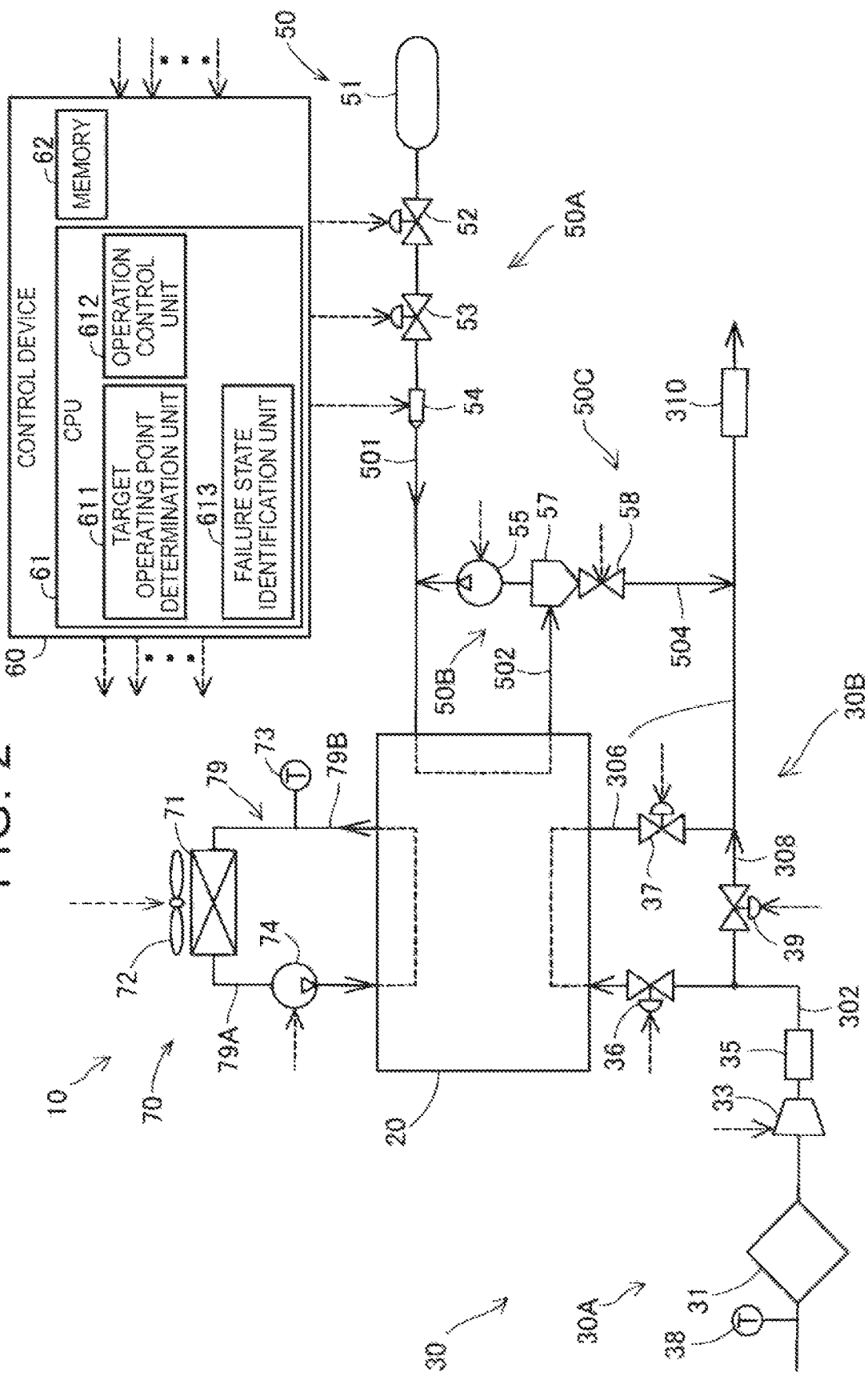
FIG. 2 is a schematic diagram showing a detailed configuration of the fuel cell system.

FIG. 2 is a schematic view showing a detailed configuration of the fuel cell system 10. The fuel cell system 10 includes a control device 60 in addition to the above-mentioned fuel cell stack 20, the oxidation gas supply/discharge system 30, the fuel gas supply/discharge system 50, and the refrigerant circulation system 70. The control device 60 controls the operation of the fuel cell system 10. Details of the control device 60 will be described later.

The oxidation gas supply/discharge system 30 includes an oxidation gas supply system 30A and an oxidation gas discharge system 30B. The oxidation gas supply system 30A supplies air, which is an oxidation gas, to the cathodes of the fuel cell stack 20. The oxidation gas supply system 30A includes a cathode supply pipe 302, an outside air temperature sensor 38, an air cleaner 31, an air compressor 33, an intercooler 35, and an inlet valve 36.

The cathode supply pipe 302 is connected to the inlet of the cathodes of the fuel cell stack 20 and constitutes an air supply flow path for the cathodes of the fuel cell stack 20. The outside air temperature sensor 38 measures the temperature of the air taken into the air cleaner 31 as the outside air temperature. The measurement result of the outside air temperature sensor 38 is transmitted to the control device 60. The air cleaner 31 is provided on the upstream side of the air compressor 33 in the cathode supply pipe 302, and removes foreign matter in the air that is supplied to the fuel cell stack 20.

The air compressor 33 is provided on the upstream side of the fuel cell stack 20 in the cathode supply pipe 302, and sends out air compressed to a pressure according to a command from the control device 60 toward the cathodes. In the present embodiment, the air compressor 33 is composed of a turbo compressor.

The intercooler 35 is provided on the downstream side of the air compressor 33 in the cathode supply pipe 302. The intercooler 35 cools the air compressed by and heated by the air compressor 33. The inlet valve 36 adjusts the air pressure on the cathode inlet side of the fuel cell stack 20. The inlet valve 36 is composed of a solenoid valve or an electric valve whose opening degree is controlled by the control device 60. The inlet valve 36 may be composed of an on-off valve that opens mechanically when air of a predetermined pressure flows in.

The oxidation gas discharge system 30B discharges the cathode off gas to the outside of the fuel cell vehicle. The oxidation gas discharge system 30B includes an exhaust gas pipe 306 and a bypass pipe 308.

The exhaust gas pipe 306 is connected to the outlet of the cathodes of the fuel cell stack 20 and constitutes a discharge flow path for the cathode off gas. The exhaust gas pipe 306 has a function of discharging the exhaust gas of the fuel cell stack 20 including the cathode off gas to the atmosphere. The exhaust gas discharged to the atmosphere from the exhaust gas pipe 306 includes the anode off gas and the air flowing out from the bypass pipe 308 in addition to the cathode off gas. A muffler 310 for reducing the exhaust noise of the exhaust gas is provided at the downstream end portion of the exhaust gas pipe 306.

The exhaust gas pipe 306 is provided with an outlet valve 37. The outlet valve 37 is provided in a part of the exhaust gas pipe 306 on the upstream side of a point where the bypass pipe 308 is connected to the exhaust gas pipe 306. The outlet valve 37 is composed of a solenoid valve or an electric valve. The outlet valve 37 adjusts the back pressure of the cathodes of the fuel cell stack 20 with its opening degree being adjusted by the control device 60.

The bypass pipe 308 connects the cathode supply pipe 302 and the exhaust gas pipe 306 without passing through the fuel cell stack 20. The bypass pipe 308 is provided with a bypass valve 39. The bypass valve 39 is composed of a solenoid valve or an electric valve. When the bypass valve 39 is opened, a part of the air flowing through the cathode supply pipe 302 flows into the exhaust gas pipe 306 through the bypass pipe 308. The control device 60 adjusts the flow rate of the air flowing into the bypass pipe 308 by adjusting the opening degree of the bypass valve 39.

The fuel gas supply/discharge system 50 includes a fuel gas supply system 50A, a fuel gas circulation system 50B, and a fuel gas discharge system 50C.

The fuel gas supply system 50A supplies fuel gas to the anodes of the fuel cell stack 20. The fuel gas supply system 50A includes an anode supply pipe 501, a fuel gas tank 51, an on-off valve 52, a regulator 53, and an injector 54.

The anode supply pipe 501 is connected to the fuel gas tank 51, which is a supply source of the fuel gas, and the inlet of the anodes of the fuel cell stack 20, and constitutes a fuel gas supply flow path to the anodes of the fuel cell stack 20. The fuel gas tank 51 stores, for example, high-pressure hydrogen gas. The on-off valve 52 is provided in a position before the fuel gas tank 51 in the anode supply pipe 501. The on-off valve 52 distributes the fuel gas of the fuel gas tank 51 to the downstream side in the valve open state. The regulator 53 is provided on the downstream side of the on-off valve 52 in the anode supply pipe 501. The regulator 53 adjusts the pressure of the fuel gas on the upstream side of the injector 54 by being controlled by the control device 60.

The injector 54 is provided on the downstream side of the regulator 53 in the anode supply pipe 501. The injector 54 is provided in a part of the anode supply pipe 501 on the upstream side of a confluence point of the anode supply pipe 501 and the anode circulation pipe 502, which will be described later. The injector 54 is an on-off valve that is electromagnetically driven according to the drive cycle and the valve opening time set by the control device 60. The control device 60 adjusts the supply amount of the fuel gas supplied to the fuel cell stack 20 by controlling the injector 54.

The fuel gas circulation system 50B circulates the anode off gas discharged from the anodes of the fuel cell stack 20 to the anode supply pipe 501 after separating the liquid components. The fuel gas circulation system 50B includes an anode circulation pipe 502, a gas-liquid separator 57, and a circulation pump 55.

The anode circulation pipe 502 is connected to the outlet of the anodes of the fuel cell stack 20 and the anode supply pipe 501, and constitutes a fuel gas circulation path that guides the anode off gas discharged from the anodes to the anode supply pipe 501. The gas-liquid separator 57 provided in the anode circulation pipe 502 separates a liquid component containing water vapor from the anode off gas and stores the liquid component in the state of liquid water. The circulation pump 55 is provided on the downstream side of the gas-liquid separator 57 in the anode circulation pipe 502. The circulation pump 55 sends out the fuel off gas that has flowed into the gas-liquid separator 57 to the anode supply pipe 501.

The fuel gas discharge system 50C discharges the anode off gas and the liquid water stored in the gas-liquid separator 57 to the exhaust gas pipe 306. The fuel gas discharge system 50C has an anode discharge pipe 504 and an exhaust drain valve 58. The anode discharge pipe 504 is connected to the discharge port of the gas-liquid separator 57 and the exhaust gas pipe 306, and constitutes an exhaust drainage path that discharges from the fuel gas supply/discharge system 50 the waste water discharged from the discharge port of the gas-liquid separator 57 and a part of the anode off gas passing through the gas-liquid separator 57. The exhaust drain valve 58 is provided in the anode discharge pipe 504 and opens and closes the anode discharge pipe 504. As the exhaust drain valve 58, for example, a diaphragm valve is used. At the time of electric power generation of the fuel cell system 10, the control device 60 gives an instruction to the exhaust drain valve 58 to open the valve at a predetermined timing. When the exhaust drain valve 58 is opened, the water stored in the gas-liquid separator 57 and the anode off gas are discharged to the atmosphere through the exhaust gas pipe 306.

The refrigerant circulation system 70 includes a refrigerant circulation path 79, a refrigerant circulation pump 74, a radiator 71, a radiator fan 72, and a fuel cell (FC) temperature sensor 73.

The refrigerant circulation path 79 has a refrigerant supply path 79A and a refrigerant discharge path 79B. The refrigerant supply path 79A is a pipe for supplying the refrigerant to the fuel cell stack 20. The refrigerant discharge path 79B is a pipe for discharging the refrigerant from the fuel cell stack 20. The refrigerant circulation pump 74 sends out the refrigerant in the refrigerant supply path 79A to the fuel cell stack 20. The radiator 71 cools the refrigerant flowing inside the radiator 71 by sending air from the radiator fan 72 to discharge heat. The FC temperature sensor 73 is installed near the discharge port of the cooling medium of the fuel cell stack 20 and measures the temperature of the cooling medium flowing through the refrigerant circulation path 79. In the fuel cell system 10, the temperature of the cooling medium is regarded as the temperature of the fuel cell stack 20 (hereinafter, referred to as "FC temperature").

The control device 60 is also called an electronic control unit (ECU), and is configured as a computer including a central processing unit (CPU) 61 and a memory 62. The CPU 61 functions as a target operating point determination unit 611, an operation control unit 612, and a failure state identification unit 613 by reading and executing the control program stored in the memory 62.

The target operating point determination unit 611 determines the warm-up target operating point of the fuel cell stack 20. In the present embodiment, the warm-up target operating point of the fuel cell stack 20 means a warm-up target operating point serving as the target among the operating points defined by the output voltage and the output current of the fuel cell stack 20. When a predetermined condition for starting the warm-up operation is satisfied, the target operating point determination unit 611 determines the target operating point according to the required electric power amount during warm-up and the required heat generation amount during warm-up for the fuel cell stack 20.

The operation control unit 612 controls at least one of the output voltage and the output current of the fuel cell stack 20 to control the operation of the fuel cell stack 20 so that the operating point of the fuel cell stack 20 becomes the target operating point during the failure. In the present embodiment, the control of the output voltage of the fuel cell stack 20 is achieved by adjusting the air stoichiometric ratio or the like. Further, the control of the output current of the fuel cell stack 20 is achieved by an FC converter 95 as described later.

The failure state identification unit 613 identifies whether a predetermined auxiliary machine has failed. In the present embodiment, the "predetermined auxiliary machine" corresponds to a heater 81 described later. In the present embodiment, the failure state identification unit 613 identifies that the heater 81 has failed when a temporal change in the temperature detected by a temperature sensor (not shown) that measures the temperature inside the vehicle cabin when electric power is supplied to the heater 81 is not a change equal to or higher than a predetermined temperature, and the failure state identification unit 613 identifies that the heater 81 has not failed when the temporal change described above is a change equal to or higher than the predetermined temperature.

Figure 3:
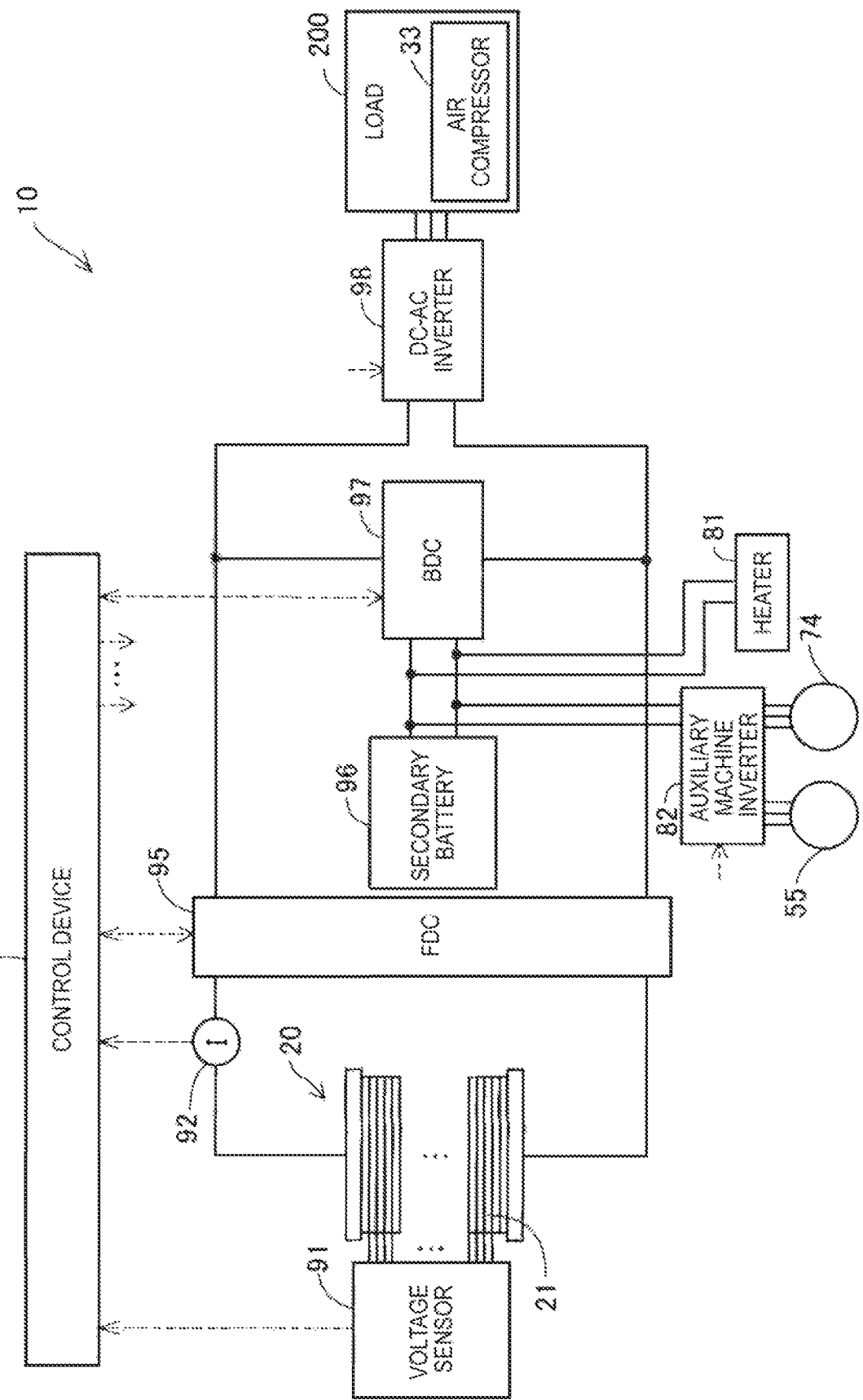
FIG. 3 is a conceptual diagram showing an electrical configuration of the fuel cell system.

FIG. 3 is a conceptual diagram showing an electrical configuration of the fuel cell system 10. The fuel cell system 10 includes the FC converter 95, a direct current-to-alternating current (DC-AC) inverter 98, a voltage sensor 91, a current sensor 92, a secondary battery 96, a battery converter 97, a heater 81, and an auxiliary machine inverter 82.

The voltage sensor 91 is used to measure the voltage of the fuel cell stack 20. The voltage sensor 91 is connected to each of all the unit cells 21 of the fuel cell stuck 20, and measures the voltage for each of all the unit cells 21. The voltage sensor 91 transmits the measurement results to the control device 60. The total voltage of the fuel cell stack 20 (hereinafter, also referred to as "FC voltage") is measured by summing up the measured voltages of all the unit cells 21 measured by the voltage sensor 91. The fuel cell system 10 may have a voltage sensor that measures the voltage at both ends of the fuel cell stack 20 instead of the voltage sensor 91. In this case, the measured voltage value at the both ends is the total voltage (output voltage) of the fuel cell stack 20. The current sensor 92 measures the output current value of the fuel cell stack 20 and transmits the output current value to the control device 60.

The FC converter 95 is composed of a direct current-to-direct current (DC-DC) converter and functions as a circuit for controlling the current of the fuel cell stack 20 (hereinafter, also simply referred to as "FC current"). The FC converter 95 controls the FC current based on the current command value transmitted from the control device 60. The current command value is a value representing a target value of the output current of the fuel cell stack 20, and is set by the control device 60.

The DC-AC inverter 98 is connected to the fuel cell stack 20 and the load 200. The load 200 includes a traction motor (not shown), which is a driving force source, and an auxiliary machine such as an air compressor 33. The DC-AC inverter 98 converts the direct current (DC) power output from the fuel cell stack 20 and the secondary battery 96 into alternating current (AC) power and supplies the AC power to the load 200. Further, when regenerative power is generated in the traveling motor included in the load 200, the DC-AC inverter 98 converts the regenerative power into DC power. The regenerative power converted into the DC power by the DC-AC inverter 98 is stored in the secondary battery 96 via the battery converter 97.

The secondary battery 96, together with the fuel cell stack 20, functions as an electric power source for the fuel cell system 10. The secondary battery 9 is charged by the electric power generated by the fuel cell stack 20 and the regenerative power described above. In the present embodiment, the secondary battery 96 is composed of a lithium ion secondary battery capable of storing generated electric power. Thus, the secondary battery 96 has a temperature characteristic that the allowable range of the charge/discharge amount becomes remarkably narrow at a temperature below the freezing point. The battery converter 97 is composed of a DC-DC converter and controls charging/discharging of the secondary battery 96 according to an instruction from the control device 60.

The heater 81 functions as a part of the air conditioner for the vehicle cabin of the vehicle, and is used to heat the cooling medium for air conditioning. The heater 81 is connected to power wirings that connect the secondary battery 96 and the battery converter 97. Electric power is supplied to the heater 81 from the fuel cell stack via the secondary battery 96 or the battery converter 97. The heater 81 also functions as a device that operates by consuming the electric power generated by the fuel cell stack during the warm-up operation described later.

The auxiliary machine inverter 82 is connected to the power wirings that connect the secondary battery 96 and the battery converter 97, similarly to the heater 81. The auxiliary machine inverter 82 converts direct current into three-phase alternating current and supplies electric power to the circulation pump 55 and the refrigerant circulation pump 74.

In the fuel cell system 10 having the above configuration, the warm-up operation is executed when the fuel cell system 10 is started in a low temperature environment, for example, when the fuel cell stack 20 is started in a state where the FC temperature is below the freezing point. The warm-up operation is an operation in which the air stoichiometric ratio is reduced as compared with that during the normal operation so that the fuel cell stack 20 generates electric power at a low efficiency and the amount of discharged heat is increased. The temperature of the fuel cell stack 20 can be rapidly raised by such discharged heat, and clogging of the air flow path due to freezing in the unit cells 21 can be eliminated. The "air stoichiometric ratio" means the ratio of the actual amount of supplied cathode gas with respect to the amount of cathode gas required to obtain a predetermined amount of electric power generated by the fuel cell stack 20.

In the fuel cell system 10, an operating point control process described later is executed, so that the operating point (output voltage and output current) during the warm-up operation is suppressed from becoming unstable even when the heater 81 is in a failed state during the warm-up operation. A state where the "operating point is unstable" means a state where at least one of the following conditions is satisfied: the voltage and the current of the fuel cell stack 20 change frequently in a short period of time; and the voltage and the current of the fuel cell stack 20 change by a value equal to or larger than a predetermined value in a short period of time.

A2. Operating Point Control Process

Figure 4:
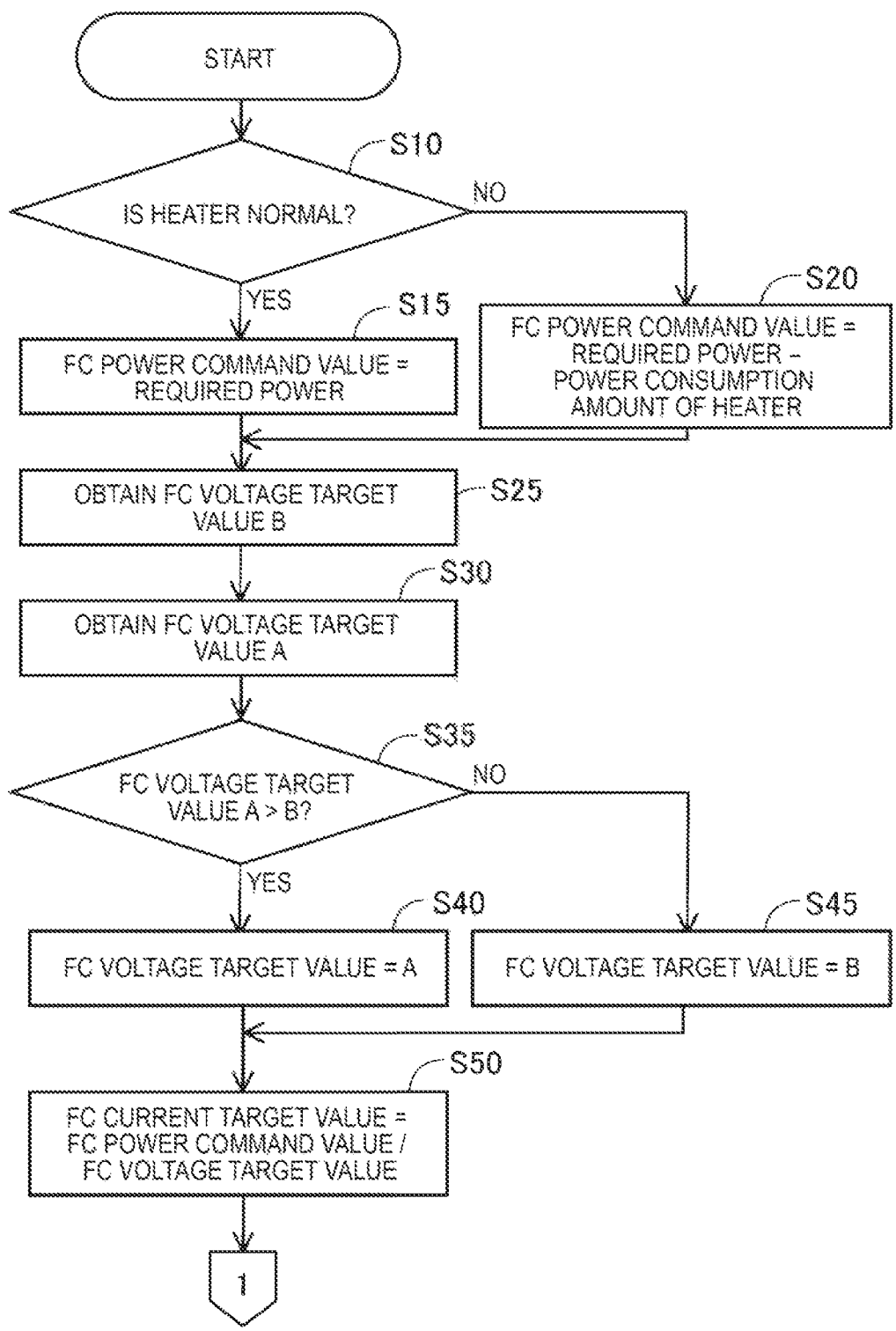
FIG. 4 is a flowchart showing a procedure of an operating point control process executed in the fuel cell system.
Figure 5:
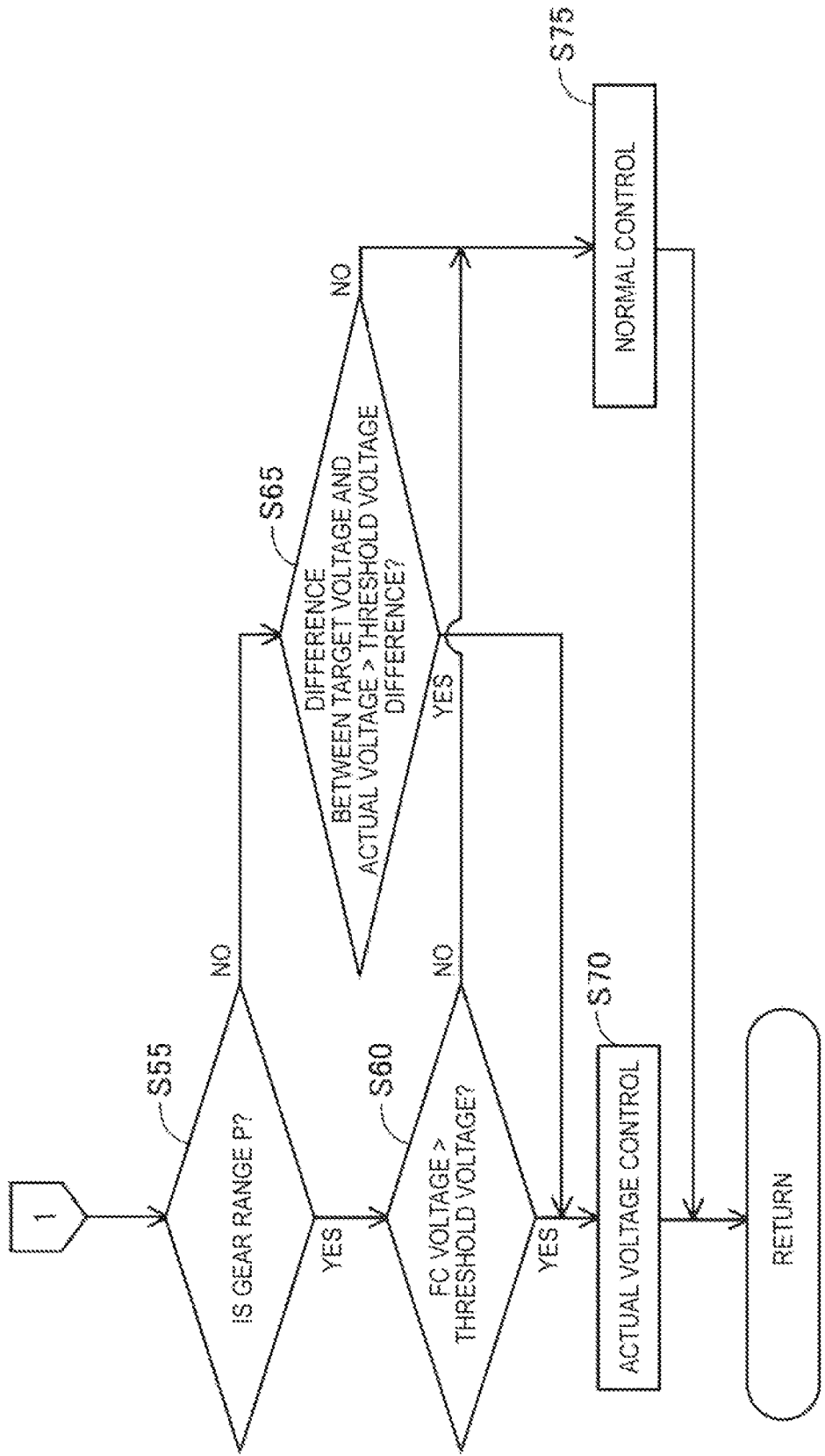
FIG. 5 is a flowchart showing a procedure of the operating point control process executed in the fuel cell system.

FIGS. 4 and 5 are flowcharts showing the procedure of the operating point control process executed in the fuel cell system 10. The operating point control process means a process of determining a target operating point of the fuel cell stack 20 and controlling the operating point to match the target operating point. The operating point control process is executed when the vehicle is started and the operation start of the fuel cell system 10 is commanded.

The failure state identification unit 613 determines whether the heater 81 is normal (step S10). When it is determined that the heater 81 is normal (step S10: Yes), the target operating point determination unit 611 sets the power command value of the fuel cell stack 20 (hereinafter, also referred to as "FC power command value") to the required power (step S15). The "FC power command value" means the electric power generation amount that is instructed to the fuel cell stack 20. The "required power" means the total value of the amount of electric power required from a device that consumes electric power in the vehicle and the control device thereof. The control device 60 has a functional unit (not shown) that identifies and sums up the required electric power generation amount from the auxiliary machines such as the circulation pump SS, the refrigerant circulation pump 74, and the heater 81, and the load 200 to calculate the required power. Step S15 means setting the electric power generation amount to be instructed to the fuel cell stack 20 to the total required electric power generation amount of the auxiliary machines, the load 200, and the like.

On the other hand, when it is determined in step S10 that the heater 81 is not normal (step S10: No), the target operating point determination unit 611 sets the FC power command value to a value obtained by subtracting the electric power consumption amount of the heater 81 from the required power (step S20).

The target operating point determination unit 611 obtains a voltage target value B of the fuel cell stack 20 (step S25). The voltage target value B corresponds to the voltage target value in a state where the heater 81 has failed. The target operating point determination unit 611 calculates the voltage target value B by applying the FC power command value of the fuel cell stack 20 obtained in step S20 and the required heat generation amount value to the following equation (1). The required heat generation amount value means a required value of the heat generation amount that is required for raising the temperature of the fuel cell stack 20 during the warm-up operation. The control device 60 has a functional unit for obtaining the required heat generation amount value during the warm-up operation. Such a functional unit can obtain the required heat generation amount value by using, for example, the outside air temperature detected by the outside air temperature sensor 38 and the FC temperature (cooling medium temperature detected by the FC temperature sensor 73). The "theoretical electromotive voltage" in the following equation (1) is stored in the memory 62 in advance as a fixed value such as 1.23 V.

$$\text{Voltage target value B} = \text{power command value}/\{(\text{power command value} + \text{required heat generation amount value})/(\text{theoretical electromotive voltage} \times \text{number of cells})\} \quad (1)$$

The target operating point determination unit 611 obtains a voltage target value A of the fuel cell stack 20 (step S30). The voltage target value A corresponds to the voltage target value in a state where the heater 81 has not failed. The target operating point determination unit 611 calculates the voltage target value A by applying the "required power" that is the power command value of the fuel cell stack 20 obtained in step S15 and the required heat generation amount value to the following equation (2). The required heat generation amount value and the theoretical electromotive voltage are the same as those in the above equation (1).

$$\text{Voltage target value A} = \text{required power}/\{(\text{required power} + \text{required heat generation amount value})/(\text{theoretical electromotive voltage} \times \text{number of cells})\} \quad (2)$$

The target operating point determination unit 611 determines whether the voltage target value A of the fuel cell stack 20 is larger than the voltage target value B (step S35). When it is determined that the voltage target value A of the fuel cell stack is larger than the voltage target value B (step S35: Yes), the target operating point determination unit 611 sets the voltage target value of the fuel cell stack 20 (hereinafter, referred to as "FC voltage target value") to the "voltage target value A" (step S40). The "FC voltage target value" means a voltage value of the target operating point. On the other hand, when it is determined that the voltage target value A of the fuel cell stack 20 is not larger than the voltage target value B (step S35: No), the target operating point determination unit 611 sets the FC voltage target value to the "voltage target value B" (step S45).

The target operating point determination unit 611 obtains a current target value of the fuel cell stack 20 (hereinafter, referred to as "FC current target value") (step S50). The "FC current target value" means a current value of the target operating point. The target operating point determination unit 611 calculates the FC current target value by applying the FC power command value and the FC target voltage value to the following equation (3).

$$\text{FC current target value} = \text{FC power command value}/\text{FC voltage target value} \quad (3)$$

Figure 6:
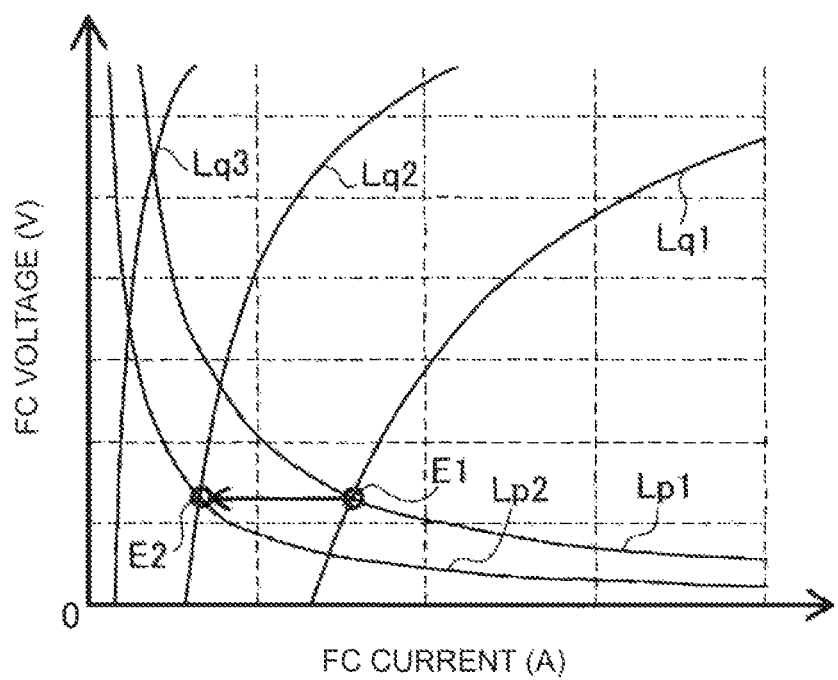
FIG. 6 is an explanatory diagram showing a difference in operating points of a fuel cell stack depending on whether a heater has failed.

FIG. 6 is an explanatory diagram showing a difference in the operating points of the fuel cell stack 20 depending on whether the heater 81 has failed. In FIG. 6, the horizontal axis represents the FC current value (A) and the vertical axis represents the FC voltage value (V). In FIG. 6, two equal power curves Lp1 and Lp2 and three equal heat generation amount curves Lq1, Lq2, and Lq3 are shown. Of the two equal power curves Lp1 and Lp2, the equal power curve Lp1 indicates a larger power (electric power generation amount) than the equal power curve Lp2. For example, the equal power curve Lp1 corresponds to the FC power command value in the state where the heater 81 has not failed, and the equal power curve Lp2 corresponds to the FC power command value in the state where the heater 81 has failed. The three equal heat generation amount curves Lq1, Lq2, and Lq3 indicate the largest heat generation amount to the smallest heat generation amount in this order.

When the required heat generation amount is the heat generation amount indicated by the equal heat generation amount curve Lq1 in the state where the heater 81 has not failed, the operating point E1 shown in FIG. 6 is determined as the target operating point based on steps S10 to S50. On the other hand, in the state where the heater 81 has failed, the operating point E2 that is an operating point on the equal power curve Lp2 of the FC power command value in the state where the heater 81 has failed, and that shows the same FC target voltage as the operating point E1 is determined as the target operating point. The operating point E2 can be considered as an operating point that satisfies the required electric power amount during the failure with a reduced required electric power amount compared with the operating point E1 (the target operating point determined in the state where the heater 81 has not failed), and the required heat generation amount during the failure with a reduced required heat generation amount compared with the operating point E1. The effect of setting such an operating point E2 as a target operating point will be described with reference to the target operating point determined in the comparative example in FIG. 7. The operating point E1 corresponds to the "warm-up target operating point determined in a situation where the failure of the electric power consumption device is not identified" in the present disclosure, and the operating point E2 corresponds to the "target operating point during the failure" in the present disclosure. In FIG. 6, the "target operating point during the failure" corresponds to the operating point E2 that satisfies the equal power curve Lp2 indicating the required electric power amount during the failure that is set to be smaller than the required electric power amount during the warm-up, and the equal heat generation amount curve Lq2 indicating the required heat generation amount during the failure that is set to be smaller than the required heat generation amount during the warm-up.

Figure 7:
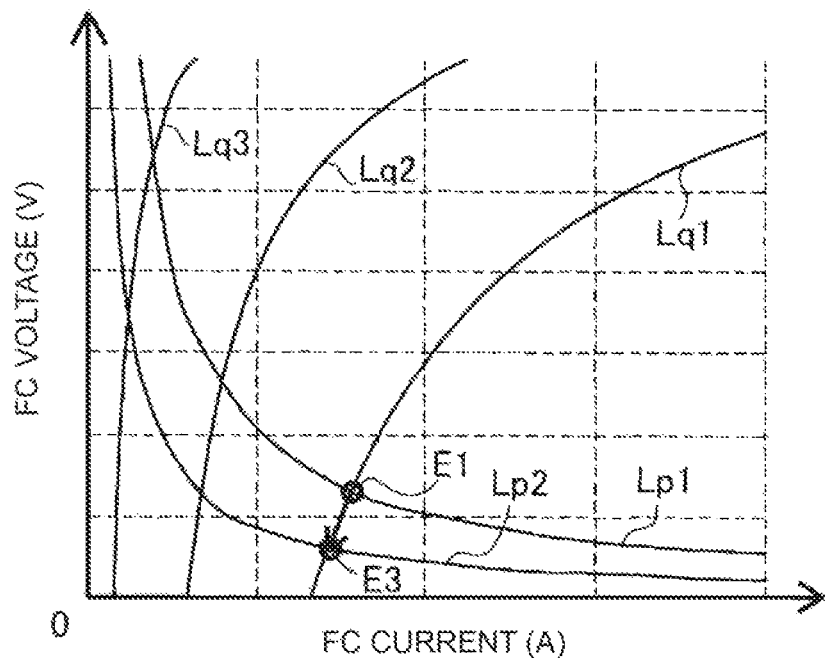
FIG. 7 is an explanatory diagram showing a difference in operating points of a fuel cell stack depending on whether a heater has failed in a comparative example.

FIG. 7 is an explanatory diagram showing a difference in the operating points of the fuel cell stack 20 depending on whether the heater 81 has failed in a comparative example. Since the vertical axis and the horizontal axis of FIG. 7 are the same as the vertical axis and the horizontal axis of FIG. 6, detailed description thereof will be omitted. In the comparative example, the target operating point is determined as an operating point that satisfies both the required power and the required heat generation amount. Thus, as shown in FIG. 7, when the heater 81 has not failed, the target operating point is set to the operating point E1 as in FIG. 6. On the other hand, when the heater 81 has failed, in the comparative example, the target operating point is set to the operating point E3 at the intersection of the equal power curve Lp2 and the equal heat generation amount curve Lq1. This operating point E3 has a lower FC voltage target value than the above-mentioned operating point E2. Therefore, when the amount of air supplied to the fuel cell stack 20 is adjusted so as to match such a target operating point, the amount of air supplied to the fuel cell stack 20 becomes extremely small especially when the warm-up operation is being executed and the air stoichiometric ratio is low. When the amount of supplied air becomes extremely small in this way, an issue arises in which the amount of pumping hydrogen generated at the cathodes of the fuel cell stack 20 increases, and the concentration of hydrogen gas in the gas discharged to the outside from the exhaust gas pipe 306 increases. The "pumping hydrogen" means hydrogen gas generated when the hydrogen gas ionized at the anodes moves to the cathodes via the electrolyte membrane and recombines with electrons. In addition, if the amount of air supplied to the fuel cell stack 20 becomes extremely small, an issue also arises in which the operating point (output voltage and output current) of the fuel cell stack 20 becomes unstable, and it becomes difficult to control the fuel cell stack 20. Such issues will be described with reference to FIG. 8.

Figure 8:
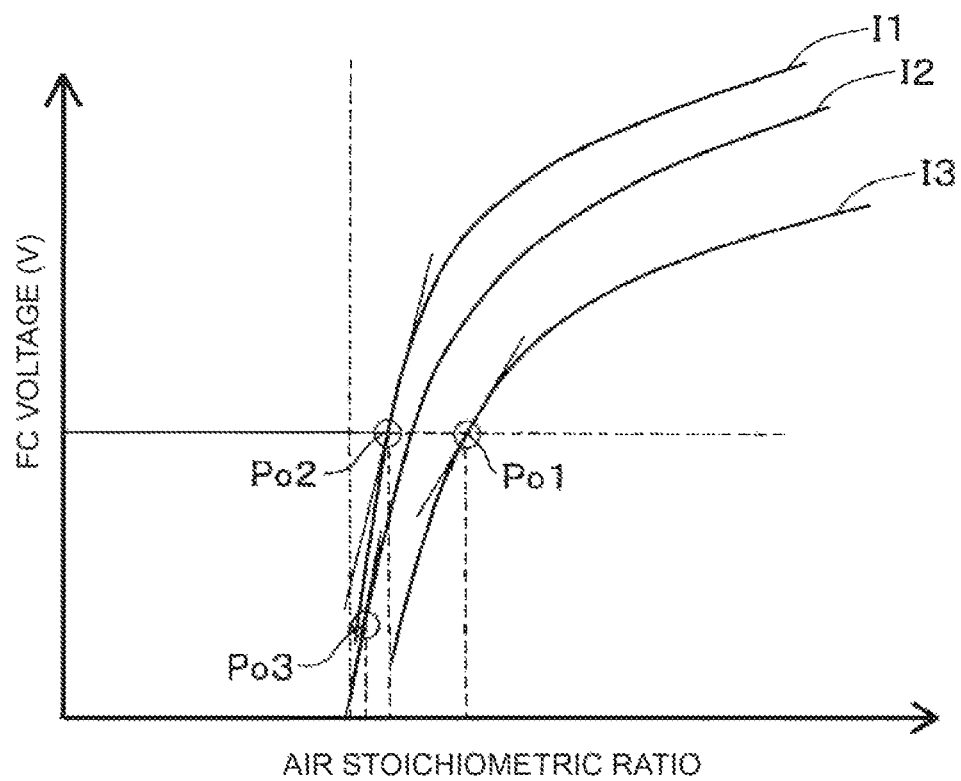
FIG. 8 is an explanatory diagram showing a change in a voltage (fuel cell (FC) voltage) of the fuel cell stack in response to a change in an air stoichiometric ratio.

FIG. g is an explanatory diagram showing a change in a voltage (FC voltage) of the fuel cell stack 20 in response to a change in the air stoichiometric ratio. In FIG. 8, the horizontal axis represents the air stoichiometric ratio and the vertical axis represents the FC voltage. In FIG. 8, three curves I1, I2, and I3 indicating the relationship between the air stoichiometric ratio and the FC voltage are shown. These three curves I1 to I3 have output current values of the fuel cell stack 20 that differ from each other. Specifically, the output current value gradually increases in the order of curve I1, curve I2, and curve I3. That is, the output current value of the curve I1 is the smallest, and the output current value of the curve I3 is the largest.

In all of the curves I1 to I3, as the air stoichiometric ratio increases, the rate of the change in the FC voltage with respect to the change in the air stoichiometric ratio (hereinafter, also simply referred to as "change rate") decreases. In other words, the change rate can be considered as "the rate of change in the output voltage of the fuel cell stack 20 with respect to the change in the air stoichiometric ratio by unit amount". When the change rate is small, even if the actual air stoichiometric ratio deviates from the target value, the amount of deviation between the actual output voltage and the target value is relatively small. On the other hand, when the change rate is large and the actual air stoichiometric ratio deviates from the target value, the amount of deviation between the actual output voltage and the target value becomes relatively large. In other words, the air stoichiometric ratio sensitivity with respect to the FC voltage increases. This makes it difficult to maintain the operating point and deteriorates the electric power balance. A state where "the electric power balance is deteriorated" means a state where the required electric power cannot be supplied or electric power is generated beyond consumption. If electric power that cannot be consumed is generated, the secondary battery 96 may be overcharged. In this case, lithium metal may be deposited at the cathode of the secondary battery 96, which may accelerate deterioration of the secondary battery 96.

Here, the point Po1 in FIG. 8 is a point corresponding to the operating point E1 shown in FIGS. 6 and 7. Similarly, the point Po2 in FIG. 8 is a point corresponding to the operating point E2 shown in FIG. 6, and the point Po3 in FIG. 8 is a point corresponding to the operating point E3 shown in FIG. 7. The change rate (inclination) at these three points Po1 to Po3 is the smallest at the point Po1, the second smallest at the point Po2, and the largest at the point Po3. Therefore, according to the present embodiment, the change rate can be reduced as compared with the comparative example, so that the stability (maintainability) of the operating point (voltage and current) can be improved and the control of the fuel cell stack 20 can be facilitated.

When the above-mentioned step S50 is completed, step S55 is executed as shown in FIG. 5. In step S55, the operation control unit 612 determines whether the selected gear range is the parking range (P). In the present embodiment, the operation control unit 612 executes step S55 by inquiring the currently selected gear range to the ECU that controls the gear range mounted on the vehicle.

When it is determined that the selected gear range is the parking range (P) (step S55: Yes), the process proceeds to step S60. When it is determined that the selected gear range is not the parking range (P) (step S55: No), the process proceeds to step S65. When the gear range is in the parking range, the vehicle is stopped and the operating point of the fuel cell stack 20 does not fluctuate much with the driver's operation.

In step S60, the operation control unit 612 determines whether the FC voltage value that is the measured voltage measured by the voltage sensor 91 (hereinafter, referred to as "FC voltage measurement value") is larger than a threshold voltage. The threshold voltage in step S60 is obtained and set in advance by an experiment or the like as an output voltage when the amount of oxygen remaining inside the fuel cell stack 20 or the cathode supply pipe 302 is equal to or larger than a predetermined amount. Further, the "predetermined amount" of the remaining oxygen amount is obtained and set in advance by an experiment or the like as an oxygen amount in which the deviation of the output voltage is equal to or larger than the predetermined voltage value as compared with the case where the remaining oxygen amount is zero in the situation where the air stoichiometric ratio is reduced. When oxygen remains inside the fuel cell stack 20 or the cathode supply pipe 302, the electric power generation amount does not decrease and the FC voltage does not decrease even if the supply amount of the cathode reaction gas is reduced as compared with the case where oxygen does not remain inside the fuel cell stack 20 or the cathode supply pipe 302.

When it is determined that the FC voltage measurement value is larger than the threshold voltage (step S60: Yes), the operation control unit 612 executes an actual voltage control process (step S70). The actual voltage control is control that adjusts the air stoichiometric ratio so that the FC voltage measurement value approaches the FC target voltage value. At this time, the current value (FC current command value) swept from the fuel cell stack 20 by the FC converter 95 is calculated by the following equation (4).

$$\text{FC current command value} = (\text{FC current target value} \times \text{FC voltage target value}) / \text{FC voltage measurement value} \quad (4)$$

For example, when the FC voltage measurement value is smaller than the FC target voltage value, adjustment is made by increasing the rotation speed of the air compressor 33 or reducing the opening degree of the bypass valve 39 so that the larger the difference between the FC voltage measurement value and the FC target voltage value is, the larger the air stoichiometric ratio is. By performing such actual voltage control, even if the remaining oxygen is present inside the fuel cell stack 20 or the cathode supply pipe 302, the control is not performed based on the air stoichiometric ratio unlike the normal control described later, Thus, for example, when starting the warm-up operation in which the air stoichiometric ratio is reduced, the deviation between the target FC voltage target value and the actual FC voltage value can be suppressed to be small. After step S70 is completed, the process returns to step S10.

When it is determined in step S60 described above that the FC voltage measurement value is not larger than the threshold voltage (step S60: No), the operation control unit 612 executes the normal control (step S75). In the normal control, the FC current target value and the PC voltage target value are applied to the following equation (5) to obtain the FC current command value, and the rotation speed of the air compressor 33 and the opening degree of the bypass valve 39 are adjusted so that the air stoichiometric ratio corresponding to the FC current command value is obtained.

$$\text{FC current command value} = (\text{FC current target value} \times \text{PC voltage target value})/\text{FC voltage target value} \quad (5)$$

Here, the memory 62 stores a map in which the rotation speed of the air compressor 33 and the opening degree of the bypass valve 39 are preset according to the air stoichiometric ratio. In step S75, the operation control unit 612 refers to the map and determines the rotation speed of the air compressor 33 and the opening degree of the bypass valve 39. In this map, the air stoichiometric ratio is associated with the rotation speed of the air compressor 33 and the opening degree of the bypass valve 39 on the assumption that there is no remaining oxygen inside the fuel cell stack 20 and the cathode supply pipe 302. Therefore, when the output voltage of the fuel cell stack 20 is equal to or smaller than the threshold voltage, the control is performed using such a map so that the deviation between the target PC voltage target value and the actual output voltage value can be suppressed to be small. After step S75 is completed, the process returns to step S10.

When it is determined in step SSS described above that the selected gear range is not the parking range (P) (step S55: No), the operation control unit 612 determines whether a voltage difference between the FC voltage target value and the voltage measured by the voltage sensor 91 (PC voltage measurement value) is larger than the threshold voltage difference (step S65). When it is determined that the voltage difference is larger than the threshold voltage difference (step S65: Yes), the above-mentioned step S70 is executed. If the selected gear range is not the parking range, for example, if the selected gear range is the driving range (D), the operating point can fluctuate significantly and frequently in response to the driver's operation. Thus, the electric power balance may be deteriorated, and the secondary battery 96 may be overcharged. Therefore, in this case, the actual voltage control is performed so that at least the output voltage value does not deviate significantly from the FC voltage target value.

On the other hand, when it is determined that the voltage difference is not larger than the threshold voltage difference (step S65: No), the above-mentioned step S75 is executed, and the normal control is executed.

According to the fuel cell system 10 in the first embodiment described above, the target operating point during the warm-up operation in a state where the heater 81 has failed is determined as the operating point that satisfies the required electric power amount during the failure that is set to be smaller than the required electric power amount during the warm-up and the required heat generation amount during the failure that is set to be smaller than the required heat generation amount during the warm-up. Thus, it is possible to suppress the air stoichiometric ratio from being excessively reduced as compared with the configuration (comparative example) in which the operating point with a reduced required electric power amount during the warm-up is determined as a new warm-up target operating point while maintaining the required heat generation amount during the warm-up, and the fuel cell is operated so as to match such a warm-up target operating point. Therefore, it is not necessary to operate the fuel cell at the operating point where the air stoichiometric ratio sensitivity with respect to the output voltage is larger, and the stability at the target operating point during the failure, that is, the ease of maintaining the output voltage and the output current to the value of the warm-up target operating point, can be improved. This can suppress the output voltage and the output current of the fuel cell from becoming unstable in a situation where an electric power consumption device capable of consuming electric power generated by the warm-up operation has failed.

Further, when the selected gear range is the parking range and the FC voltage measurement value is larger than the predetermined threshold voltage, or when the selected gear range is not the parking range (is in the driving range) and the voltage difference between the FC voltage target value and the FC voltage measurement value is larger than the predetermined threshold voltage difference, the actual voltage control is executed, so that the deviation between the output voltage of the fuel cell stack 20 and the FC voltage target value can be suppressed from becoming excessively large.

Further, when the selected gear range is the parking range and the FC voltage measurement value is not larger than the predetermined threshold voltage, or when the selected gear range is not the parking range (is in the driving range) and the voltage difference between the FC voltage target value and the FC voltage measurement value is not larger than the predetermined threshold voltage difference, the normal control is executed, so that the operating point can accurately approach the target operating point.

B. Second Embodiment

B1. System Configuration

Figure 9:
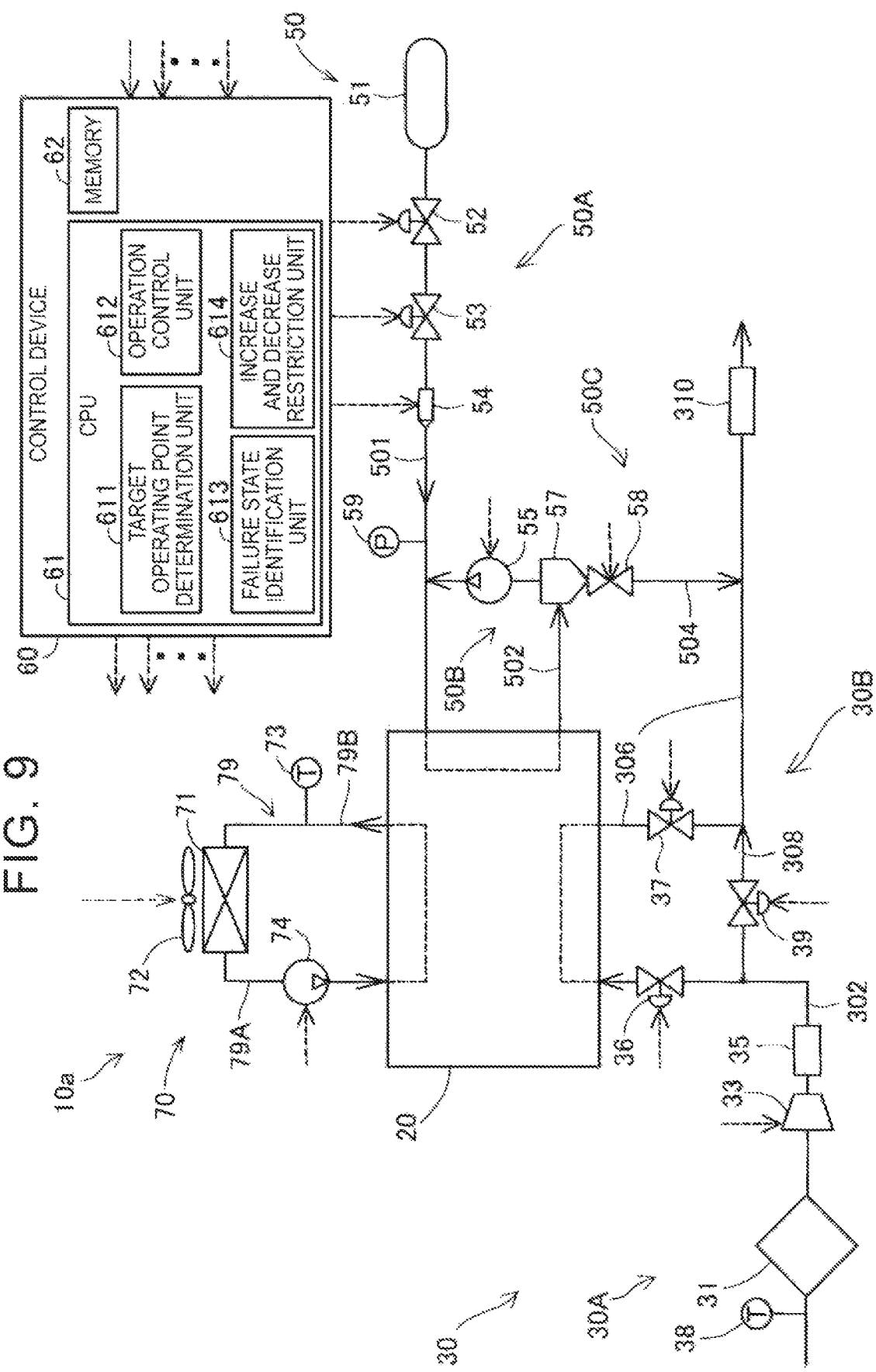
FIG. 9 is an explanatory diagram showing a schematic configuration of a fuel cell system according to a second embodiment.

FIG. 9 is an explanatory diagram showing a schematic configuration of a fuel cell system 10*a* according to a second embodiment. The fuel cell system 10*a* of the second embodiment is different from the fuel cell system 10 of the first embodiment in that the CPU 61 includes an increase and decrease restriction unit 614. Since the other configurations in the fuel cell system 10*a* of the second embodiment are the same as those of the fuel cell system 10 of the first embodiment, the same configurations are designated by the same reference characters, and detailed description thereof will be omitted.

The increase and decrease restriction unit 614 restricts the increase/decrease in the required power (required electric power amount) for the fuel cell stack 20. More specifically, the increase and decrease restriction unit 614 of the present embodiment restricts the increase/decrease in the required power by restricting the electric power supplied to the load 200. By restricting the electric power supplied to the load 200, the drive of the load 200, that is, the drive of the traction motor (not shown) is restricted, and thus the operation (driving) of the vehicle is restricted. This makes it possible to restrict the increase/decrease in the required power accompanied with the operation of the vehicle. The restriction of the electric power supplied to the load 200 can be achieved by disconnecting the electric power supplied to the load 200 in the DC-AC inverter 98. In the present embodiment, the state in which the electric power supply from the fuel cell stack 20 to the load 200 is allowed is set as "Ready" in the vehicle, and a user interface indicating whether the state is in the Ready state is provided in the vehicle. Such a user interface corresponds to, for example, a predetermined lamp or a display unit of an instrument panel. By referring to the lighting of the predetermined lamp and the display of the character string "Ready" on the display unit, the driver knows that the vehicle is in the Ready state, that is, the vehicle is in the state where the vehicle can be driven. At the time of starting the vehicle in a situation where the FC temperature is higher than the freezing point and the warm-up operation is not executed, the Ready state is permitted when the FC temperature is equal to or higher than a predetermined temperature (hereinafter, referred to as "Ready-on temperature"). In the present embodiment, the Ready-on temperature is set higher as the FC temperature at the time of starting is lower. On the other hand, when the FC temperature is below the freezing point and the warm-up operation is executed, a Ready permission control process described later is executed, and such a process determines whether the Ready state is permitted. In the fuel cell system 10a of the second embodiment, the operating point control process is executed in the same manner as in the fuel cell system 10 of the first embodiment.

B2. Ready Permission Control Process

Figure 10:
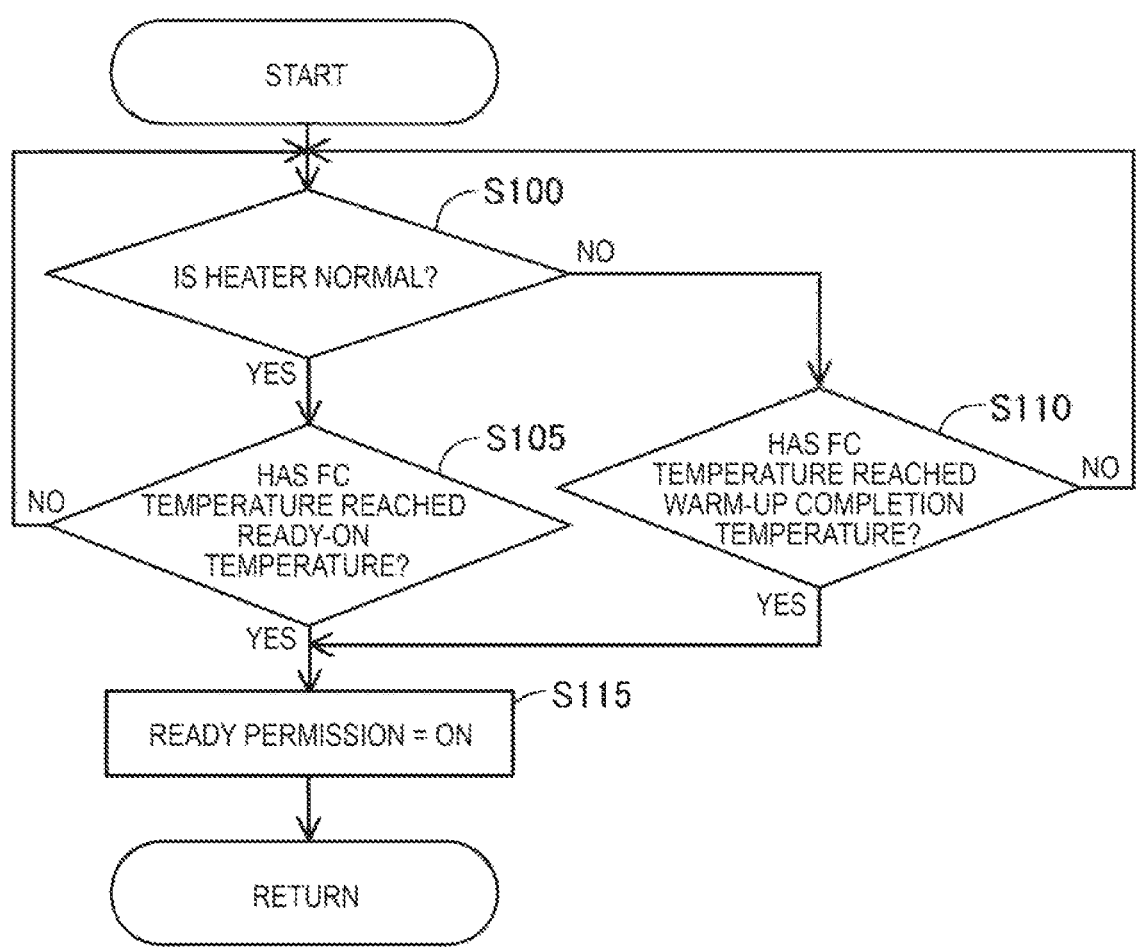
FIG. 10 is a flowchart showing a procedure of a Ready permission control process according to the second embodiment.

FIG. 10 is a flowchart showing a procedure of the Ready permission control process according to the second embodiment. The Ready permission control process is a process for controlling whether to permit the Ready state in the vehicle. After the warm-up operation is started, the Ready permission control process is executed.

The failure state identification unit 613 determines whether the heater 81 is normal (step S100). Since this step S100 is the same as step S10 of the operating point control process described above, description of the detailed procedure will be omitted.

When it is determined that the heater 81 is normal (step S100: Yes), the operation control unit 612 determines whether the FC temperature has reached the Ready-on temperature (step S105). When it is determined that the FC temperature has not reached the Ready-on temperature (step S105: No), the process returns to step S100. On the other hand, when it is determined that the FC temperature has reached the Ready-on temperature (step S105: Yes), the operation control unit 612 turns on the Ready permission flag (step S115). After step S115, the process returns to step S100. Thus, in this case, the Ready state can be established as the Ready permission flag is turned on. Further, the increase and decrease restriction unit 614 stops restricting the electric power supplied to the load 200. The Ready state is displayed on the user interface, and the driver knows that the Ready state has been established. Then, when the driver changes the gear range to the driving range (D) and performs an operation such as depressing the accelerator pedal, the electric power can be supplied from the fuel cell stack 20 to the load 200.

When it is determined in step S100 that the heater 81 is not normal (step S100: No), the operation control unit 612 determines whether the FC temperature has reached a warm-up completion temperature (step S110). The warm-up completion temperature is a temperature higher than the Ready-on temperature. For example, the Ready-on temperature is 0° C. and the warm-up completion temperature is 65° C. When it is determined that the FC temperature has not reached the warm-up completion temperature (step S110: No), the process returns to step S100. Therefore, in this case, step S115 is not executed. Accordingly, the Ready permission flag is not turned on, and the increase and decrease restriction unit 614 restricts the electric power supplied to the load 200. On the other hand, when it is determined that the FC temperature has reached the warm-up completion temperature (step S110: Yes), the warm-up operation ends, the above-mentioned step S115 is executed, and the Ready permission flag is set to ON.

According to the fuel cell system 10a of the second embodiment described above, the same effect as that of the fuel cell system 10 of the first embodiment is obtained. In addition, when the heater 81 has failed, the increase/decrease in the required power can be restricted until the FC temperature reaches the warm-up completion temperature that is higher than the Ready-on temperature. Thus, the change in the operating point can be restricted, and the voltage and the current during starting can be suppressed from becoming unstable. In addition, when the heater 81 has failed, the time until the Ready state is established can be made longer than that when the heater 81 is normal to give the driver a sense of discomfort. Therefore, the driver can be made aware that some kind of abnormality has occurred, and for example, it is possible to provide the driver with an opportunity to notify the car dealer, the repair shop, or the like of the abnormality.

C. Other Embodiments (C1) In the fuel cell systems 10 and 10a of the above embodiments, the target operating point when the heater 81 has failed (target operating point during the failure, operating point E2) is an operating point changed, by the operating point control process, from the operating point when the heater 81 is normal (operating point E1) to a point on a different equal power curve (equal power curve of the total required power excluding the power consumption of the heater 81) with the voltage maintained. However, the present disclosure is not limited to this. The target operating point when the heater 81 has failed may be an operating point that satisfies the following conditions: an operating point on the equal power curve of the required power excluding the power consumption of the heater 81; and an operating point having a voltage value that falls within a voltage range including the voltage value of the operating point when the heater 81 is normal (for example, the operating point E1). At this time, a predetermined voltage range may be a voltage range that satisfies at least one of the following Conditions I to V.

(Condition I) Condition I is a condition for determining the upper limit value of the voltage range and is a condition such that, as long as the voltage is equal to or lower than the upper limit value, the time until the warm-up is completed does not become longer than a predetermined time due to suppression of the reduction in the amount of discharged heat from the fuel cell stack 20, and the convenience does not decrease excessively.

(Condition II) Condition II is a condition for determining the upper limit value of the voltage range and is a condition such that, as long as the voltage is equal to or lower than the upper limit value, the time until the warm-up is completed does not become longer than a predetermined time, and voids in the catalyst layer in each unit cell 21 are not filled with generated water generated by the warm-up operation by a predetermined ratio or more.

(Condition III) Condition III is a condition for determining the upper limit value of the voltage range and is a condition such that, in a configuration in which a predetermined allowable deviation range of the required heat generation amount is preset, a voltage value in which the discharged heat amount (heat generation amount) of the fuel cell stack achieves the lower limit value of the predetermined allowable deviation range is considered as the upper limit voltage value of the voltage range.

(Condition IV) Condition IV is a condition for determining the lower limit value of the voltage range and is a condition such that, as long as the voltage is equal to or higher than the lower limit voltage value, the air stoichiometric ratio is not excessively reduced, so that the amount of the pumping hydrogen gas generated at the cathodes is suppressed to a value equal to or less than a predetermined threshold amount, and the concentration of the hydrogen gas discharged to the outside is suppressed to a predetermined concentration or less.

(Condition V) Condition V is a condition for determining the upper limit value and the lower limit value of the voltage range and is a condition such that, when the flow rate of the cathode reaction gas is achieved so as to operate the fuel cell stack 20 at the target operating point during the failure and the flow rate of the cathode reaction gas is changed from the flow rate described above, the rate of change in the output voltage of the fuel cell stack 20 with respect to the change in the flow rate of the cathode reaction gas by unit amount (change rate) is equal to or smaller than a predetermined threshold rate.

By satisfying the above Condition I, in the situation where the heater 81 has failed, it is possible to suppress the output voltage and the output current of the fuel cell stack 20 from becoming unstable, and it is also possible to suppress a decrease in the convenience due to the extension of the time until the warm-up is completed.

By satisfying the above Condition II, it is possible to suppress the voids in the catalyst layer in each unit cell 21 from being filled with the generated water generated by the warm-up operation by a predetermined ratio or more, so that it is possible to suppress so-called flooding and a decrease in the electric power generation amount of the fuel cell stack 20.

By satisfying the above Condition III, it is possible to suppress the discharged heat amount (heat generation amount) of the fuel cell stack 20 from falling below the lower limit value of the predetermined allowable deviation range, and it is possible to suppress the time required for the warm-up to be completed from becoming equal to or longer than a predetermined time.

By satisfying the above Condition IV, the amount of the pumping hydrogen generated at the cathodes can be reduced, and the concentration of the hydrogen gas discharged to the outside can be suppressed to a predetermined concentration or less.

By satisfying the above Condition V, the change rate can be kept within a predetermined range, and deterioration of the electric power balance can be suppressed. Therefore, it is possible to suppress the secondary battery 96 from being charged at a voltage exceeding the limit, and it is possible to suppress the amount of lithium metal deposited at the cathodes from becoming larger than a predetermined amount.

The voltage value of the operating point E3 of the comparative example shown in FIG. 7 is a voltage value that falls outside any voltage range that satisfies the above Conditions I to V. In other words, in the comparative example, none of the above Conditions I to V is satisfied. For example, the operating point E3 is an operating point where, when the flow rate of the cathode reaction gas is achieved so as to operate the fuel cell stack 20 at the operating point E3 and the flow rate of the cathode reaction gas is changed from the flow rate described above, the rate of change in the output voltage of the fuel cell stack 20 with respect to the change in the flow rate of the cathode reaction gas by unit amount (change rate) becomes larger than the threshold rate. Therefore, issues such as the following occur: the time until the warm-up is completed becomes excessively long, the voids in the catalyst layer are filled with the generated water generated in the warm-up operation by a predetermined ratio or more, the amount of the pumping hydrogen generated at the cathodes cannot be reduced, and the amount of lithium metal deposited at the cathodes becomes larger than a predetermined amount. According to the above embodiments and the present embodiment, it is possible to suppress the occurrence of these issues.

(C2) In the above embodiments, the "predetermined auxiliary machine" that is used for determination by the failure state identification unit 613 whether the "predetermined auxiliary machine" has failed is the heater 81, and whether the heater 81 is normal is determined in the operating point control process and the Ready permission control process. However, the present disclosure is not limited to this. The "predetermined auxiliary machine" may be any device capable of consuming electric power generated by the fuel cell stack 20, such as the circulation pump 55 and the refrigerant circulation pump 74, in place of or in addition to the heater 81. Further, whether such a device is normal may be determined in the operating point control process and the Ready permission control process. Even in such a configuration, the same effect as that of each embodiment is obtained.

(C3) In the second embodiment, the increase and decrease restriction unit 614 restricts the increase/decrease in the required power by restricting the electric power supplied to the load 200, but the present disclosure is not limited to this. As a result of calculating the required power, if the amount of change in the required power is equal to or larger than a predetermined fluctuation threshold value, the required power may be corrected so that the fluctuation of the required power (required power command value) is set to the fluctuation threshold value.

(C4) The fuel cell system 10*a* of the second embodiment executes the operating point control process in the same manner as the fuel cell system 10 of the first embodiment. However, the fuel cell system 10*a* of the second embodiment need not execute the operating point control process. Even in such a configuration, by executing the Ready permission control process, when the heater 81 has failed, it is possible to spare a long time from the Ready permission OFF state to the Ready permission ON state, and a fluctuation in the operating point (voltage and current) can be suppressed during that period. In addition, the driver can be informed that some abnormality has occurred.

(C5) In the operating point control process of the above embodiments, steps SSS and S65 may be omitted. In such a configuration, the actual voltage control (step S70) is executed when the voltage measured by the voltage sensor 91 is larger than the threshold voltage regardless of the selected gear range. Therefore, even in such a configuration, it is possible to suppress the deviation between the output voltage of the fuel cell stack 20 and the FC voltage target value from becoming excessively large.

(C6) The configurations of the fuel cell systems 10 and 10*a* in the above embodiments are merely examples and can be changed in various ways. For example, the fuel cell systems 10 and 10*a* may be mounted on any moving body such as a ship or an aircraft instead of a vehicle, and may be used by supplying electric power to a drive device of the moving body. The fuel cell systems 10 and 10*a* may also be used as a stationary power supply. Further, each unit cell 21 constituting the fuel cell stack 20 is a single unit cell for a polymer electrolyte fuel cell, but may be configured as a single unit cell for various fuel cells such as a phosphoric acid fuel cell, a molten carbonate fuel cell, a solid oxide fuel cell, and the like.

(C7) A part of the configuration realized by hardware in the above embodiments may be replaced with software, and conversely, a part of the configuration realized by software in the above embodiments may be replaced with hardware. For example, at least a part of the functional units of the control device 60 may be implemented by an integrated circuit, a discrete circuit, or a module combining these circuits. When some or all of the functions of the present disclosure are implemented by software, the software (computer program) can be provided so that it is stored in a computer-readable storage medium. The "computer-readable storage medium" is not limited to a portable storage medium such as a flexible disk or a compact disc read-only memory (CD-ROM), but includes an internal storage device in a computer such as various random access memories (RAMs) or read-only memories (ROMs), and also includes an external storage device fixed to a computer such as a hard disk. That is, the "computer-readable storage medium" has a broad meaning including any non-transitory storage medium on which data packets can be fixed.

The present disclosure is not limited to the embodiments above, and can be implemented with various configurations without departing from the scope of the present disclosure. For example, the technical features of the embodiments corresponding to the technical features in each mode described in the section of the summary may be replaced or combined appropriately to solve some or all of the above issues or to achieve some or all of the above effects. When the technical features are not described as essential in this specification, the technical features can be deleted as appropriate.

What is claimed is:

1. A fuel cell system comprising:
a fuel cell that receives supply of air and fuel gas to generate electric power;
a target operating point determination unit that determines a warm-up target operating point based on a required electric power amount during warm-up and a required heat generation amount during warm-up when a predetermined condition for starting warm-up operation is satisfied, the warm-up target operating point being a target of an operating point during the warm-up operation of the fuel cell that is defined by an output voltage and an output current;
an operation control unit that controls at least one of the output voltage and the output current to operate the fuel cell at the warm-up target operating point; and
a failure state identification unit that identifies whether an electric power consumption device that operates by consuming generated electric power generated by the fuel cell has failed, wherein
when a failure of the electric power consumption device is identified, the target operating point determination unit determines an operating point that satisfies a required electric power amount during a failure that is set to be smaller than the required electric power amount during the warm-up and a required heat generation amount during the failure that is set to be smaller than the required heat generation amount during the warm-up as a target operating point during the failure.

2. The fuel cell system according to claim 1, wherein:
a voltage value of the target operating point during the failure is a voltage value that falls within a predetermined voltage range including a voltage value of the warm-up target operating point that is determined when the condition is satisfied in a situation where the failure of the electric power consumption device is not identified; and
the voltage range is a range of a voltage value in which a rate of a change in the output voltage with respect to a change in an air stoichiometric ratio by unit amount when the air stoichiometric ratio is changed in a state where the fuel cell is operated at the target operating point during the failure is equal to or less than a predetermined threshold rate.

3. The fuel cell system according to claim 2, wherein:
the fuel gas is hydrogen gas; and
a lower limit voltage value of the voltage range is a voltage value in which an amount of the hydrogen gas generated at a cathode of the fuel cell is equal to or less than a predetermined threshold amount when the fuel cell is operated at the target operating point during the failure.

4. The fuel cell system according to claim 2, further comprising a lithium ion secondary battery configured to store the generated electric power, wherein the lower limit voltage value of the voltage range is a voltage value in which an amount of lithium metal deposited at a cathode of the lithium ion secondary battery is equal to or less than a predetermined amount when the fuel cell is operated at the target operating point during the failure and the generated electric power is supplied to the lithium ion secondary battery.

5. The fuel cell system according to claim 2, wherein:
a predetermined allowable deviation range is predetermined for the required heat generation amount during the warm-up; and
an upper limit voltage value of the voltage range is a voltage value in which a heat generation amount of the fuel cell achieves a lower limit value of the allowable deviation range.

6. The fuel cell system according to claim 2, wherein:
after starting the warm-up operation, the operation control unit ends the warm-up operation when a temperature of the fuel cell reaches a predetermined warm-up completion temperature; and
the fuel cell system further includes an increase and decrease restriction unit that increases or decreases the required electric power amount during the warm-up until the warm-up operation ends when the failure state identification unit identifies that the electric power consumption device has failed.

7. The fuel cell system according to claim 6, wherein:
the fuel cell system is mounted on a moving body to supply electric power to a drive device of the moving body; and
when the failure state identification unit identifies that the electric power consumption device has failed, the increase and decrease restriction unit restricts electric power supplied to the drive device to restrict an increase and a decrease in the required electric power amount during the warm-up until the warm-up operation ends.

8. The fuel cell system according to claim 2, wherein:
the fuel cell system is mounted on a vehicle having a plurality of gear ranges including at least a parking range and a driving range, and supplies electric power to a traction motor of the vehicle;
the fuel cell system further includes a voltage sensor for measuring the output voltage; and when the gear range that is selected is the parking range and a measured voltage measured by the voltage sensor is larger than a predetermined threshold voltage, the operation control unit executes an actual voltage control process to adjust at least the air stoichiometric ratio such that the measured voltage measured by the voltage sensor approaches the voltage value of the target operating point during the failure.

9. The fuel cell system according to claim 8, wherein when the gear range that is selected is not the parking range and a voltage difference between the voltage value of the target operating point during the failure and the measured voltage is larger than a predetermined threshold voltage difference, the operation control unit executes the actual voltage control process.

10. A control method of a fuel cell system including a fuel cell that receives supply of air and fuel gas to generate electric power, the control method comprising:
- determining a warm-up target operating point based on a required electric power amount during warm-up and a required heat generation amount during warm-up when a predetermined condition for starting warm-up operation is satisfied, the warm-up target operating point being a target of an operating point during the warm-up operation of the fuel cell that is defined by an output voltage and an output current;
- controlling at least one of the output voltage and the output current to operate the fuel cell at the warm-up target operating point;
- identifying whether an electric power consumption device that operates by consuming generated electric power generated by the fuel cell has failed; and
- determining, when a failure of the electric power consumption device is identified, an operating point that satisfies a required electric power amount during a failure that is set to be smaller than the required electric power amount during the warm-up and a required heat generation amount during the failure that is set to be smaller than the required heat generation amount during the warm-up as a target operating point during the failure.

11. A non-transitory storage medium storing instruction, for controlling a fuel cell system including a fuel cell that receives supply of air and fuel gas to generate electric power, that are executable by one or more processors and that cause the one or more processors to perform functions characterized by comprising:
- determining a warm-up target operating point based on a required electric power amount during warm-up and a required heat generation amount during warm-up when a predetermined condition for starting warm-up operation is satisfied, the warm-up target operating point being a target of an operating point during the warm-up operation of the fuel cell that is defined by an output voltage and an output current;
- controlling at least one of the output voltage and the output current to operate the fuel cell at the warm-up target operating point;
- identifying whether an electric power consumption device that operates by consuming generated electric power generated by the fuel cell has failed; and
- determining, when a failure of the electric power consumption device is identified, an operating point that satisfies a required electric power amount during a failure that is set to be smaller than the required electric power amount during the warm-up and a required heat generation amount during the failure that is set to be smaller than the required heat generation amount during the warm-up as a target operating point during the failure.

* * * * *